Patented Jan. 15, 1935

1,987,610

UNITED STATES PATENT OFFICE 1,987,610

ORGANIC ESTER OF CELLULOSE AND METHOD OF TREATING THE SAME

Camille Dreyfus, New York, N. Y., and George Schneider, Montclair, N. J., assignors to Celanese Corporation of America, a corporation of Delaware No Drawing. Application July 8, 1930.
Serial No. 466,576.

17 Claims. (Cl. 260—102)

This invention relates to the treatment of cellulose acetate or other organic esters of cellulose to prepare it in a form that is more suitable for working.

An object of our invention is to melt or fuse cellulose acetate or other organic esters of cellulose without substantial decomposition. A further object of our invention is to prepare cellulose acetate or other organic esters of cellulose in a form that is easily ground. Other objects of our invention will appear from the following detailed description.

Cellulose acetate or other organic esters of cellulose when heated in the ordinary manner decomposes before it melts. Therefore, heretofore, it was not considered possible to melt cellulose acetate for commercial purposes. Moreover cellulose acetate as prepared, either by precipitation from the acetylation solution or dope or by the suspension method of acetylation, is in the form of fibres which are not friable so that grinding of the same is very difficult. In order to prepare solutions of the cellulose acetate, it is desirable to have the same in as finely divided form as possible in order that less time should be required for dissolving the same. Moreover molding powders containing cellulose acetate should have the cellulose acetate in a finely divided form.

We have found that if cellulose acetate or other organic esters of cellulose is heated with water or similar liquids under high pressures and at temperatures above 100° C. and corresponding to the boiling point of water at such pressures, the cellulose acetate melts or fuses. The molten or fused cellulose acetate is quite friable so that it can be easily ground to finely divided form, which is very desirable for making solutions or molding powders.

In accordance with our invention we melt or fuse without substantial decomposition an organic ester of cellulose by subjecting the same in the presence of a liquid which is not a solvent for the same to super-atmospheric pressures and temperatures above 100° C.

While this invention will be described specifically in connection with cellulose acetate it is equally applicable to other organic esters of cellulose such as cellulose formate, cellulose propionate and cellulose butyrate.

As stated the cellulose acetate is heated with a liquid which is not a solvent for the same at the temperatures and pressures prevailing during the treatment. Because of economy, we prefer water or aqueous liquid but other non-solvents such as benzol may be employed.

In the case of water or aqueous liquid as treating agent, the pressure employed will be from 50 to 250 or more lbs. per square inch above atmospheric, and the temperature is that of boiling water at such pressures. We prefer the higher pressures say 150 lbs. to 250 lbs. or more and the temperatures corresponding thereto. Generally the lower the temperatures and pressures the greater will be the required time of treatment.

In carrying out the invention, the cellulose acetate and the water or other treating liquid is placed in a closed vessel such as an autoclave and heat applied until the required temperatures and pressures develop. If desired the temperatures and pressures may be attained by injecting steam under high pressure into the closed vessel containing the cellulose acetate and water. However any other suitable method may be employed and if desired greater pressure than developed by the water at the prevailing temperatures may be superposed upon the treating vessel by mechanical means or otherwise.

The cellulose acetate fuses to a hard and horny mass which is quite friable and therefore easily ground. The fused cellulose acetate may be ground in a suitable grinding device such as a ball mill, tube mill, impact pulverizer, edge runner and the like to any desired degree of fineness. The powdered cellulose acetate is in an excellent form for technical applications. Thus it may be dissolved very quickly in organic solvents for making solutions to be employed for spinning yarn, casting films and the like, for making plastic compositions or for making lacquers or other coating compositions.

Another important application of this invention is for the making of molding powder. The ground cellulose acetate made in accordance with this invention may be mixed with plasticizers such as triacetin, dibutyl phthalate, diethyl phthalate, diethyl tartrate, dibutyl tartrate, mono-methyl-xylene sulfonamid and the like to form a molding powder to which pigments and other effect materials may be added. If desired the fused cellulose acetate may be ground in the presence of the plasticizer to form the molding powder. Such molding powders may be molded under heat and pressure to form any desired articles. As an alternative, the plasticizers may be added to the cellulose acetate before it is fused or melted by our process.

It is to be understood that the foregoing description is given merely by way of illustration and that many variations may be made therein without departing from the spirit of this invention.

Having described our invention, what we claim and desire to secure by Letters Patent is:

1. Process of fusing an organic ester of cellulose comprising subjecting the organic ester of cellulose in the presence of a non-solvent liquid to elevated temperatures and pressures until fusion occurs.

2. Process of fusing cellulose acetate comprising subjecting the cellulose acetate in the presence of a non-solvent liquid to elevated temperatures and pressures until fusion occurs.

3. Process of fusing an organic ester of cellulose without substantial decomposition comprising heating the organic ester of cellulose with an aqueous liquid at temperatures above 100° C. and at super-atmospheric pressures until fusion occurs.

4. Process of fusing cellulose acetate without substantial decomposition comprising heating the cellulose acetate with an aqueous liquid at temperatures above 100° C. and at super-atmospheric pressures until fusion occurs.

5. Process of fusing an organic ester of cellulose without substantial decomposition comprising heating the organic ester of cellulose with water until a pressure of more than 50 lbs. per square inch above atmospheric develops and until fusion occurs.

6. Process of fusing cellulose acetate without substantial decomposition comprising heating the cellulose acetate with water until a pressure of more than 50 lbs. per square inch above atmospheric develops and until fusion occurs.

7. Process of fusing cellulose acetate without substantial decomposition comprising heating the cellulose acetate with water until a pressure of more than 100 lbs. per square inch above atmospheric develops and until fusion occurs.

8. Process of fusing an organic ester of cellulose without substantial decomposition which comprises heating the organic ester of cellulose with water at a pressure between 50 and 250 lbs. per square inch above atmospheric and until fusion occurs.

9. Process of fusing cellulose acetate without substantial decomposition which comprises heating the cellulose acetate with water at a pressure between 50 and 250 lbs. per square inch above atmospheric and until fusion occurs.

10. Process of fusing an organic ester of cellulose without substantial decomposition which comprises heating the organic ester of cellulose with water at a pressure between 150 and 250 lbs. per square inch above atmospheric and until fusion occurs.

11. Process of fusing cellulose acetate without substantial decomposition which comprises heating the cellulose acetate with water at a pressure between 150 and 250 lbs. per square inch above atmospheric and until fusion occurs.

12. Process of preparing a finely divided organic ester of cellulose comprising fusing the organic ester of cellulose by heating the same with water at super-atmospheric pressure and then grinding the fused organic ester of cellulose.

13. Process of preparing a finely divided cellulose acetate comprising fusing the cellulose acetate by heating the same with water at super-atmospheric pressure and then grinding the fused cellulose acetate.

14. Fused organic ester of cellulose that is not substantially decomposed, produced in accordance with the process of claim 1.

15. Fused cellulose acetate that is not substantially decomposed, produced in accordance with the process of claim 2.

16. Finely divided organic ester of cellulose formed by grinding fused ester of cellulose that is not substantially decomposed, produced in accordance with the process of claim 12.

17. Finely divided cellulose acetate formed by grinding fused cellulose acetate that is not substantially decomposed, produced in accordance with the process of claim 13.

CAMILLE DREYFUS.
GEORGE SCHNEIDER.

Leslie Frazer

CERTIFICATE OF CORRECTION.

Patent No. 1,987,610. January 15, 1935.

CAMILLE DREYFUS, ET AL.

It is hereby certified that error appears in the printed specification of the above numbered patent requiring correction as follows: Page 2, second column, line 37, claim 16, after "fused" insert the word organic; and that the said Letters Patent should be read with this correction therein that the same may conform to the record of the case in the Patent Office.

Signed and sealed this 5th day of March, A. D. 1935.

(Seal) Acting Commissioner of Patents.